United States Patent
Drake et al.

(10) Patent No.: US 8,344,937 B2
(45) Date of Patent: Jan. 1, 2013

(54) METHODS AND APPARATUS FOR INTEGRATION OF DISTRIBUTED SENSORS AND AIRPORT SURVEILLANCE RADAR TO MITIGATE BLIND SPOTS

(75) Inventors: Peter R. Drake, Northborough, MA (US); Yuchoi F. Lok, Framingham, MA (US)

(73) Assignee: Raytheon Company, Waltham, MA (US)

( * ) Notice: Subject to any disclaimer, the term of this patent is extended or adjusted under 35 U.S.C. 154(b) by 358 days.

(21) Appl. No.: 12/761,590

(22) Filed: Apr. 16, 2010

(65) Prior Publication Data

US 2010/0265120 A1    Oct. 21, 2010

Related U.S. Application Data

(60) Provisional application No. 61/170,250, filed on Apr. 17, 2009, provisional application No. 61/226,884, filed on Jul. 20, 2009.

(51) Int. Cl.
*G01S 13/72* (2006.01)
(52) U.S. Cl. ........... 342/36; 342/59; 342/26 R; 342/159; 342/90; 342/95
(58) Field of Classification Search .................... 342/36, 342/59, 26 R, 26 D, 159, 90, 95–97
See application file for complete search history.

(56) References Cited

U.S. PATENT DOCUMENTS

| | | | |
|---|---|---|---|
| 3,448,450 A | 6/1969 | Alfandari et al. | |
| 4,961,075 A | 10/1990 | Ward | |
| 6,215,438 B1 | 4/2001 | Oswald et al. | |
| 6,653,971 B1 | 11/2003 | Guice et al. | |
| 7,006,038 B2 | 2/2006 | Smith | |
| 7,675,458 B2 * | 3/2010 | Hubbard et al. | 342/159 |
| 7,864,103 B2 * | 1/2011 | Weber et al. | 342/123 |
| 7,948,429 B2 * | 5/2011 | Drake et al. | 342/26 R |
| 8,115,333 B2 * | 2/2012 | Parsche et al. | 290/55 |
| 8,217,828 B2 * | 7/2012 | Kirk | 342/62 |
| 8,253,621 B1 * | 8/2012 | Friesel | 342/95 |
| 2001/0033246 A1 | 10/2001 | Burchett et al. | |
| 2002/0024652 A1 * | 2/2002 | Ooga | 356/28.5 |
| 2004/0119633 A1 | 6/2004 | Oswald et al. | |
| 2007/0024494 A1 * | 2/2007 | Dizaji et al. | 342/90 |
| 2008/0266171 A1 * | 10/2008 | Weber et al. | 342/123 |

(Continued)

FOREIGN PATENT DOCUMENTS

EP    1345044 A1    9/2003

(Continued)

OTHER PUBLICATIONS

Notification of Transmittal of the International Search Report and the Written Opinion of the International Searching Authority, or the Declaration, PCT/US2009/042789 dated Aug. 25, 2009.

(Continued)

*Primary Examiner* — John B Sotomayor
(74) *Attorney, Agent, or Firm* — Daly, Crowley, Mofford & Durkee, LLP

(57) ABSTRACT

Methods and apparatus for a first radar; identifying a blind spot in coverage of the first radar; providing a second radar to illuminate the blind spot, and merging data from the first and second radars using target classification prior to tracking to reduce false targets. In one embodiment, polarimetric data is used to classify targets.

15 Claims, 16 Drawing Sheets

U.S. PATENT DOCUMENTS

| | | | |
|---|---|---|---|
| 2009/0202347 A1* | 8/2009 | Rugger | 416/31 |
| 2010/0079328 A1* | 4/2010 | Drake et al. | 342/36 |
| 2010/0265120 A1* | 10/2010 | Drake et al. | 342/36 |
| 2011/0181455 A1* | 7/2011 | Vanuytven | 342/27 |
| 2011/0260908 A1* | 10/2011 | New et al. | 342/59 |

FOREIGN PATENT DOCUMENTS

| | | |
|---|---|---|
| GB | 1100119 | 1/1968 |
| GB | 0701869.0 | 1/2007 |
| GB | 0710209.8 | 5/2007 |
| GB | 2439204 A | 12/2007 |
| GB | 0710209.8 | 5/2008 |
| GB | 2447560 A | 9/2008 |
| GB | 2448488 A | 10/2008 |
| GB | 0813679.8 | 2/2009 |
| GB | 2439205 B | 4/2009 |
| GB | 2441053 B | 4/2009 |
| GB | 2453121 A | 4/2009 |
| GB | 2447560 A | 7/2009 |
| GB | 2447560 B | 10/2009 |
| GB | 2461848 A | 1/2010 |
| GB | 2461849 A | 1/2010 |
| GB | 2461850 A | 1/2010 |
| GB | 2461851 A | 1/2010 |
| WO | WO 9800729 | 1/1998 |
| WO | WO 0003264 A1 | 1/2000 |
| WO | WO 0159473 A2 | 8/2001 |
| WO | WO 0159473 A3 | 8/2001 |
| WO | WO 2008001092 A2 | 1/2008 |
| WO | WO 2008001092 A3 | 1/2008 |
| WO | WO 2008093036 A2 | 8/2008 |
| WO | WO 2008093036 A3 | 8/2008 |
| WO | WO 2008093092 A2 | 8/2008 |
| WO | WO 2008093092 A3 | 8/2008 |
| WO | WO 2008/145993 | 12/2008 |
| WO | WO 2008145993 A2 | 12/2008 |
| WO | WO 2010028831 A1 | 3/2010 |

OTHER PUBLICATIONS

Written Opinion of the International Searching Authority, PCT/US2009/042789 dated Aug. 25, 2009.

U.S. Appl. No. 12/435,508, filed May 5, 2009.

Notification of Transmittal of the International Search Report and the Written Opinion of the International Searching Authority, or the Declaration, PCT/US2010/031372 dated Jul. 19, 2010, 6 pages.

Written Opinion of the International Searching Authority, PCT/US2010/031372 dated Jul. 19, 2010, 11 pages.

Jackson, C.A.; Butler, M.M.: "Options for mitigation of the effects of windfarms on radar systems", Radar Systems, 2007 IET International Conference OON, Oct. 18, 2007, XP007913802, ISSN: 0537-9989, ISBN: 978-0-86341-848-8, 6 pages.

Bannister, David J.: "Radar in-fill for Greater Wash area—Feasibility study final report", Aug. 31, 2007, XP007913816, Retrieved from the Internet: URL:http://www.bwea.com/pdf/AWG_Reference/0709%20BERR%20COWRIE%20Radar%20in-fill%20for%20Greater%20Wash%20area%20-%20Feasibility%20study%20final%20report.pdf, 41 pages.

Raytheon Canada Ltd.: "Report on advanced mitigating techniques to remove the effects of wind turbines and wind farms on the Raytheon ASR-10/23SS Radars", Jul. 17, 2006, XP007913794, Retrieved from the Internet: URL:http://www.decc.gov.uk/assets/decc/what%20we%20do%20uk%20energy%20supply/energy%20mix/renewable%20energy/planning/on_off_wind/aero_military/file37012.pdf_and_file37014.pdf, 98 pages.

Auld: "Options for mitigating the impact of wind turbines on NERL's primary radar infrastructure" 2006, XP007913817, Retrieved from the internet: URL:http://www.bwea.com/pdf/AWG_Reference/0701%20BERR%20Options%20for%20mitigating%20the%20impacts%20of%20wind%20turbines%20on%20NERL%27s%20primary%20radar%20infrastructure.pdf, 11 pages.

Perry, J. et al.: "Wind Farm Clutter Mitigation in Air Surveillance Radar", Radar Conference, 2007 IEEE, IEEE, PI LNKD—DOI:10.1109/RADAR.2007.374197, Apr. 1, 2007, XP031180885, ISBN: 978-1-4244-0283-0, 6 pages.

Craig Webster, "Wind farms vs. radar—seeing through the clutter", Cambridge Consultants, Innovation Day 2008, Oct. 22, 2008, 29 pages.

Notice of Allowance and Issue Fee due for U.S. Appl. No. 12/435,508, filed May 5, 2009, 17 pages.

Notification Concerning Transmittal of International Preliminary Report on Patentability (Chapter 1 of the Patent Cooperation Treaty), PCT/US2010/031372, date of mailing Oct. 27, 2011, 11 pages.

* cited by examiner

Given:
- R Range
- $I_c, Q_c$ co-polarization
- $I_r, Q_r$ reverse polarization

Select I&Q data from the specified range
1300

$$Z_{DR} = 10 \log_{10}\left(\frac{I_c^2 + Q_c^2}{R^4}\right) - 10 \log\left(\frac{I_r^2 + Q_r^2}{R^4}\right)$$
1302

$$\phi_{DR} \tan^{-1}\left(\frac{I_c}{Q_c}\right) - \tan^{-1}\left(\frac{I_r}{Q_r}\right)$$
1304

$Z_{DR}$ = differential reflectivity
$\phi_{DR}$ = differential phase

*FIG. 13*

METHODS AND APPARATUS FOR INTEGRATION OF DISTRIBUTED SENSORS AND AIRPORT SURVEILLANCE RADAR TO MITIGATE BLIND SPOTS

CROSS REFERENCE TO RELATED APPLICATIONS

The present application claims the benefit of U.S. Provisional Patent Application No. 61/170,250, filed on Apr. 17, 2009, and U.S. Provisional Patent Application No. 61/226,884, filed on Jul. 20, 2009, which are both incorporated herein by reference.

STATEMENT REGARDING FEDERALLY SPONSORED RESEARCH

This invention was made with Government support under Contract F19628-96-D-0038 awarded by the US Air Force. The Government may have certain rights in the invention.

BACKGROUND

As is known in the art, there are a number of significant blind spots for certain types of radars. For example, blinds spots can be due to terrain obstruction and/or Earth curvature, man-made objects, such wind farms, and interference created by wind farms. Such blind spots can significantly degrade radar performance.

SUMMARY

In one aspect of the invention, a method comprises employing a first radar, identifying a blind spot in coverage of the first radar, providing a second radar to illuminate the blind spot, and merging data from the first and second radars using target classification prior to tracking to reduce false targets.

The method can further include one or more of the following features: the blind spot is created by a wind farm, the first radar is an airport surveillance radar and the second radar is a gap filler radar, the gap filler radar is a pencil beam radar, the airport surveillance radar includes parallel paths for a high beam receiver and a low beam receiver, identifying false targets by one or more of: an altitude estimation of a target is low and is near the blind spot, which includes a wind farm area; an estimated radial velocity of the target does not match scan-to-scan movement; a wide Doppler spectrum fits the wind turbine profile; and the target is not detected by the second radar, which is a pencil-beam gap filler radar, identifying an aircraft target by detecting an altitude estimation drop due to interference by the wind farm that is higher than a predefined wind farm altitude; and/or detecting the target by the pencil-beam gap filler radar with an aircraft classification having a confidence factor greater than and is classified as aircraft with a confidence factor greater than a selected threshold, the target classification includes polarimetric characteristics, and the target classification includes at one or more of polarimetric characteristics, altitude estimation, detection cluster shape, and Doppler information.

In another aspect of the invention, a system comprises a first radar having a blind spot in coverage for the first radar, a second radar to illuminate the blind spot, and a tracker to merge data from the first and second radars using target classification prior to tracking to reduce false targets.

The system can further include one or more of the following features: the blind spot is created by a wind farm, the first radar is an airport surveillance radar and the second radar is a gap filler radar, the gap filler radar is a pencil beam radar, the airport surveillance radar includes parallel paths for a high beam receiver and a low beam receiver, the tracker identifies false targets by one or more of: an altitude estimation of a target is low and is near the blind spot, which includes a wind farm area; an estimated radial velocity of the target does not match scan-to-scan movement; a wide Doppler spectrum fits the wind turbine profile; and the target is not detected by the second radar, which is a pencil-beam gap filler radar, the tracker identifies an aircraft target by detecting an altitude estimation drop due to interference by the wind farm that is higher than a predefined wind farm altitude; and/or detecting the target by the pencil-beam gap filler radar with an aircraft classification having a confidence factor greater than and is classified as aircraft with a confidence factor greater than a selected threshold, the target classification includes polarimetric characteristics, and the target classification includes at one or more of polarimetric characteristics, altitude estimation, detection cluster shape, and Doppler information.

BRIEF DESCRIPTION OF THE DRAWINGS

The foregoing features of this invention, as well as the invention itself, may be more fully understood from the following description of the drawings in which:

FIG. 13 is a flow diagram showing exemplary inphase and quadrature data processing;

DETAILED DESCRIPTION

Figure 1:
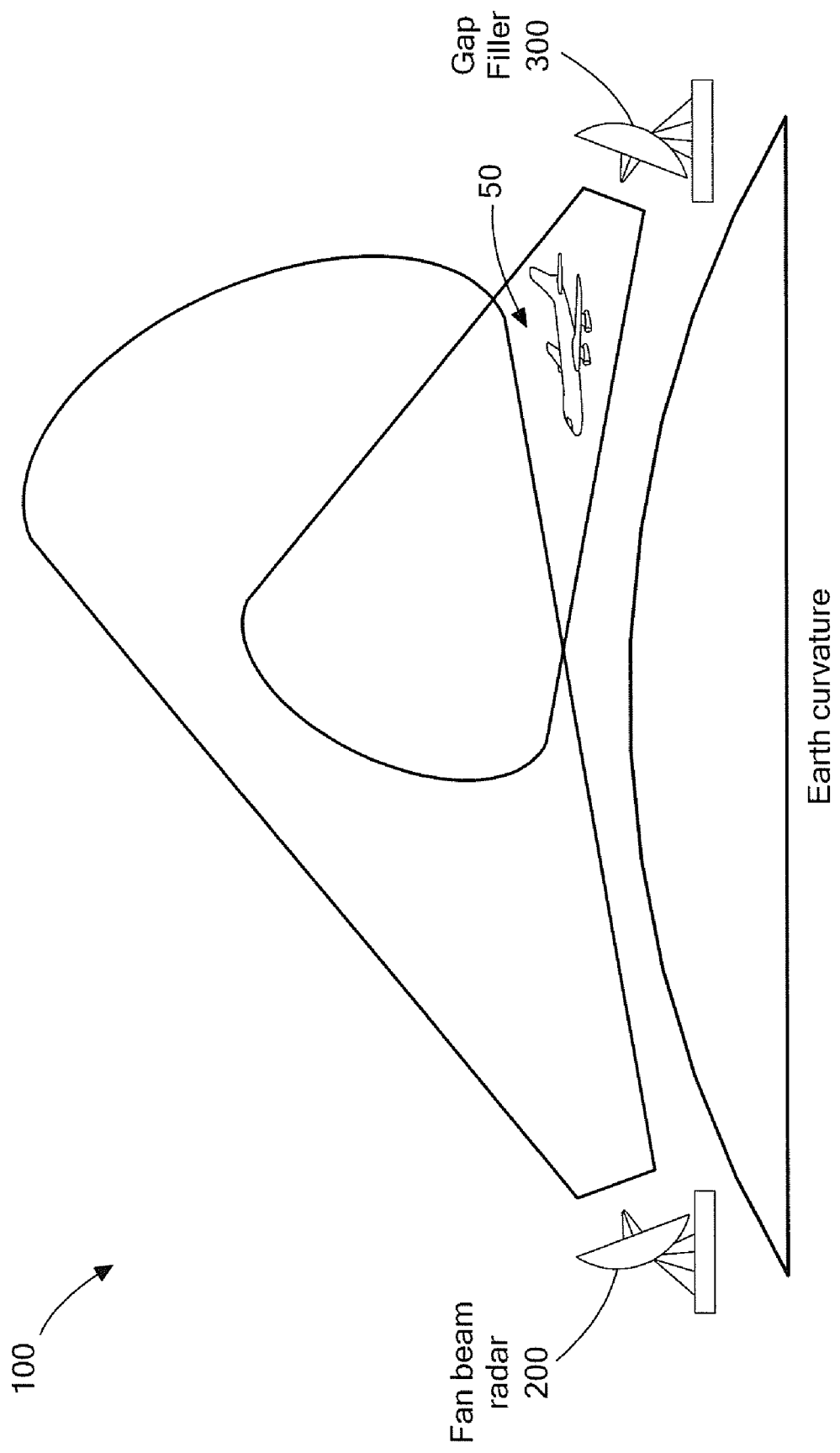
FIG. 1 is a pictorial representation of a system having an airport surveillance radar and a gap filler radar.

FIG. 1 shows an exemplary system 100 including an airport surveillance radar (ASR) 200 and a relatively small phased array, for example, radar 300. The phased array radar 300 illuminates an area 50 under the field of view of the airport surveillance radar 200 resulting from curvature of the earth. As can be seen, the earth curvature creates a radar blind spot for the airport surveillance radar 200 that is addressed by the phased array radar 300. As described below, data from the airport surveillance radar and the phased array radar can be merged to mitigate blind spots. It is understood that any practical number of radars, such as small phased array radars, can be added to illuminate desired areas and contribute data.

Figure 2:
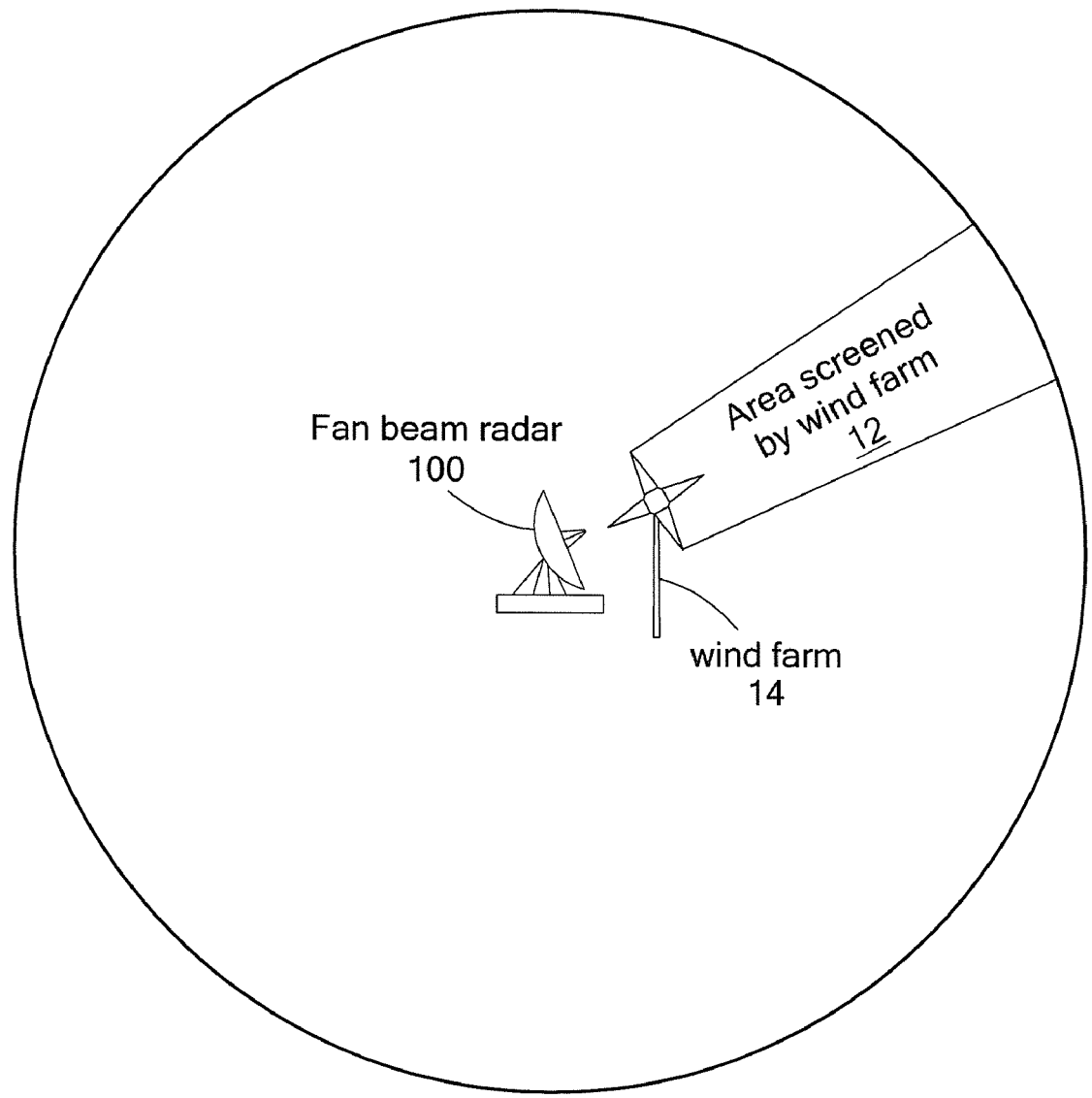
FIG. 2 is a pictorial representation of an airport surveillance radar with a blind spot caused by a wind farm.
Figure 3:
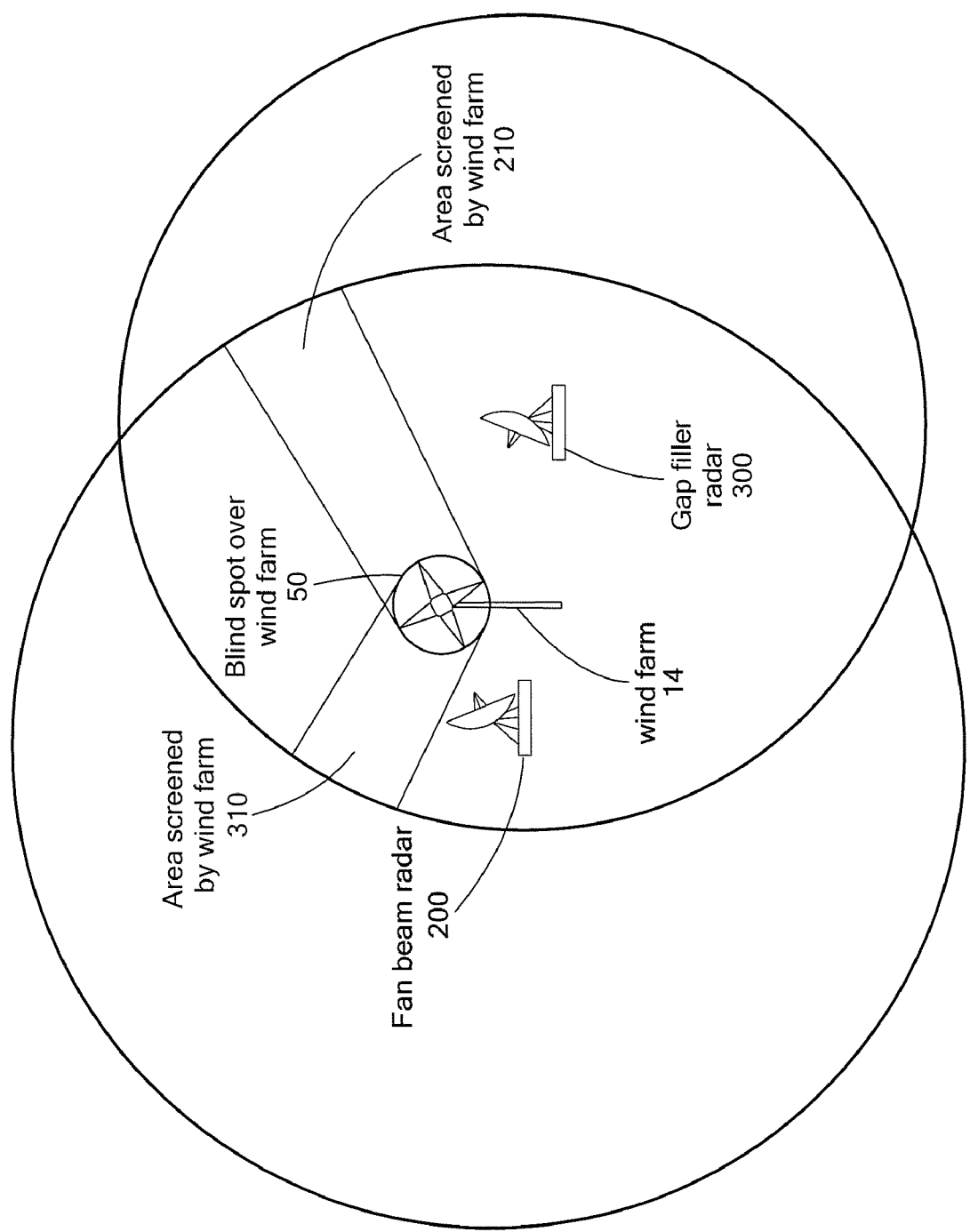
FIG. 3 is a schematic representation of system including gap filler radar to illuminate blind spots in an airport surveillance radar caused by a wind farm.

FIG. 2 shows a system including an airport surveillance radar 100 having a blind spot 12 due to a wind farm 14. FIG. 3 shows an exemplary system including a fan beam airport surveillance radar 200 and a gap filler radar 300 that illuminates a blind spot 210 in the airport surveillance radar 200 created by a wind farm 14. In similar way, the gap filler radar blind spot 310 is covered by the fan beam airport surveillance radar 200. A blind spot 50 remains at the wind farm location.

The blind spot 50 is due to interference resulting from rotations of the individual wind turbines that create Doppler frequencies that the radar can detect as (false) moving targets. False targets may flood the wind farm area so that the radar detection mechanism may not be able to separate an aircraft flying over the wind farm from these false targets.

Figure 4:
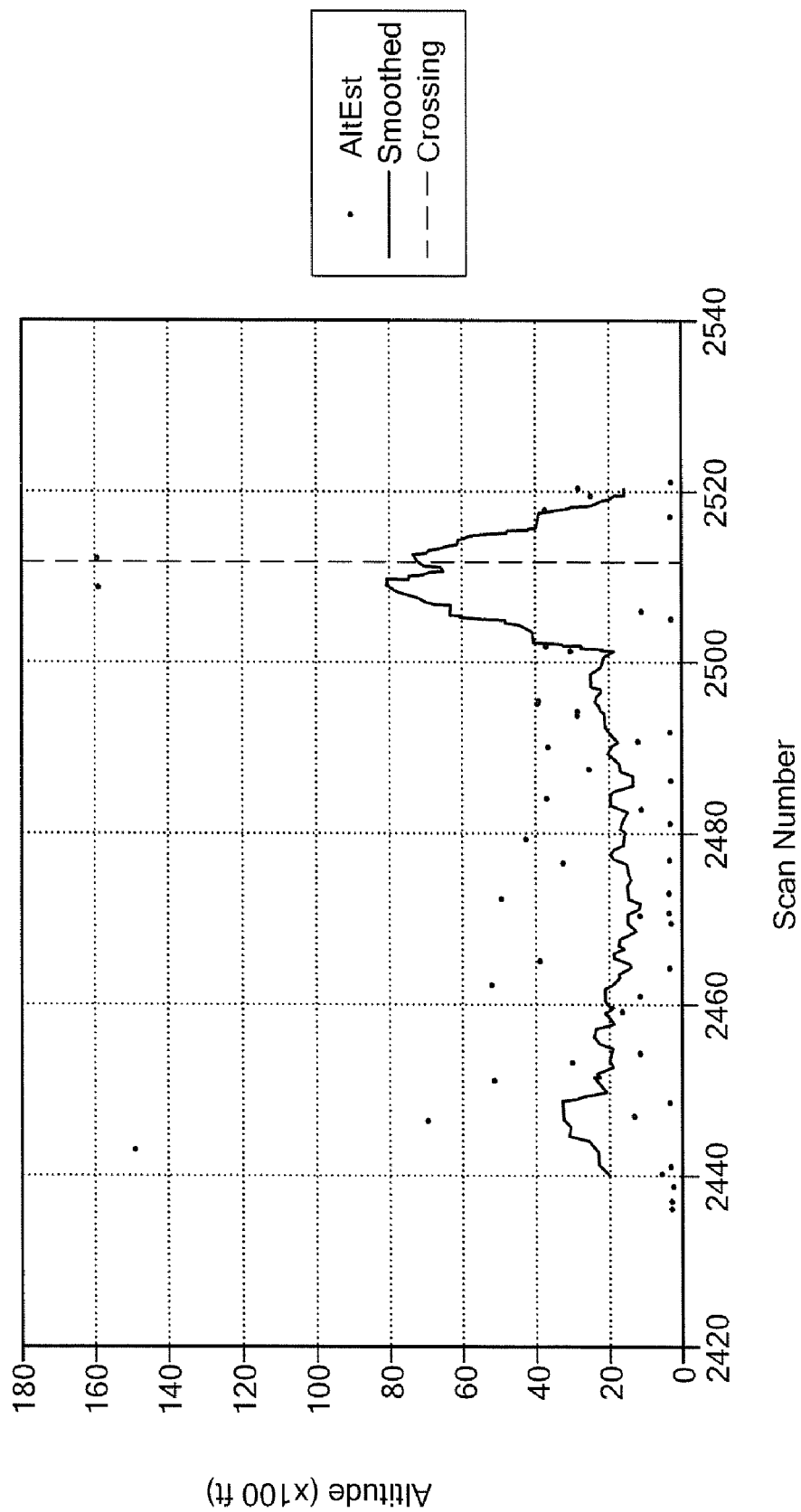
FIG. 4 is a graphical depiction of the estimated plot altitude on the wind farm is averaged to about 2,000 ft; when an aircraft flew over the wind farm at 16,000 ft, the resultant estimated altitude became 7,000 ft.

While conventional beam processing can estimate target altitude, false targets from the wind farm 14 will have low altitudes. When an aircraft is flying over the wind farm 14, the resultant estimated altitude will be somewhere between the actual aircraft altitude and the wind farm altitude, as shown in FIG. 4. Using the estimated altitude alone will not solve this type of blind spot in all cases. FIG. 4 shows that due to the limitation of the concurrent beam processing capability, the estimated plot altitude on the wind farm is averaged to about 2,000 ft. When an aircraft flew over the wind farm at 16,000 ft, the resultant estimated altitude became 7,000 ft.

In accordance with exemplary embodiments of the invention, merging data from a gap filler radar with an airport surveillance radar can mitigate blind spots. In one embodiment, a relatively low-cost phased array radar can be used as gap filler radar with pencil-beam illumination that can detect aircraft flying over wind farms without the interference from the rotating turbines.

Figure 5:
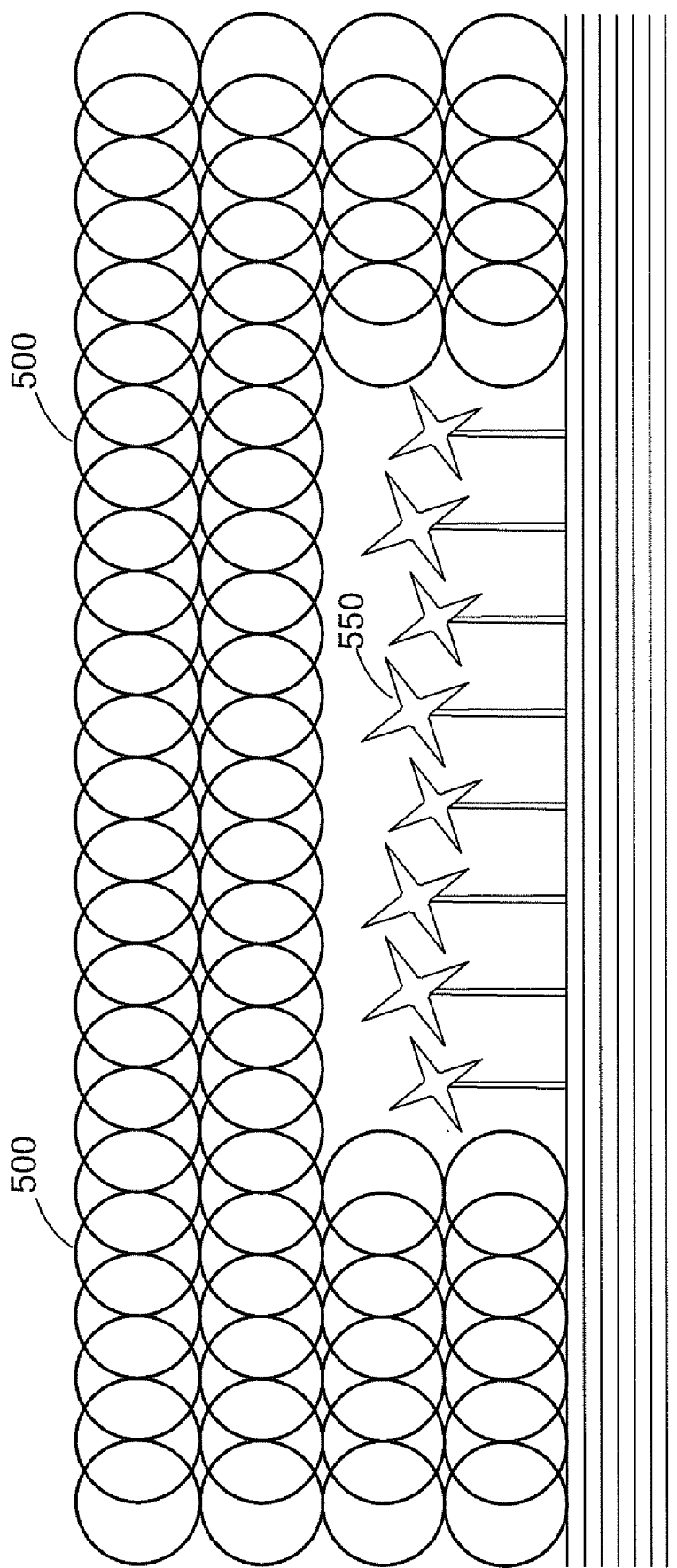
FIG. 5 is a pictorial representation of a pencil beam gap filler radar illuminating a blind spot and avoiding a wind farm.

FIG. 5 shows an example scan pattern for pencil beam gap filler radar skipping over the wind farm 550. As can be seen, the pencil beams 500 can be directed to illuminate the blind spot area while avoiding the wind farm 550.

Conventional radar systems use a multi-sensor multiple hypothesis tracker to merge radar data. However, this approach alone cannot avoid merging false targets from the radar data, which can result in degraded performance.

Figure 6:
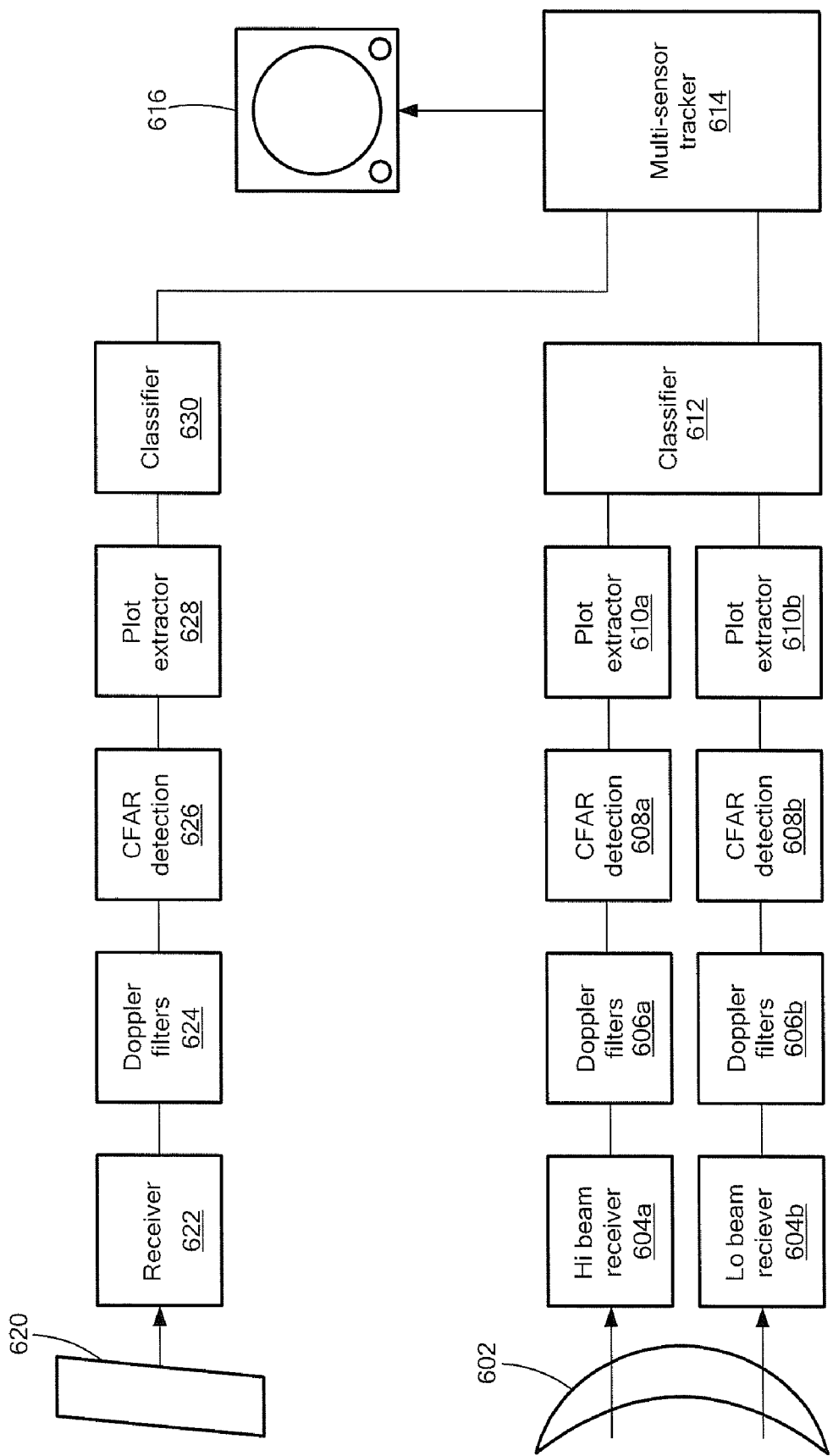
FIG. 6 is a schematic representation showing processing modules in an airport surveillance radar and a gap filler radar.

In accordance with exemplary embodiments of the invention, the inventive system merges targets that have been classified before tracking. In one embodiment shown in FIG. 6, each radar has signal processing that includes similar processing. An airport surveillance radar 602 can include parallel data paths for a high beam receiver 604a and a low beam receiver 604b. The high and low data paths can include respective Doppler filtering 606a,b, CFAR detection 608a,b and plot extractor 610a,b. A classifier 612 coupled to the plot extractors 610a,b provides output data to a multi-sensor tracker 614 coupled to a display 616. The gap filler radar 620 includes a receiver 622, doppler filter 624, CFAR detection 626, plot extractor 628, and classifier 630, which provides data to the multi-sensor tracker 614.

In general, features of each detection cluster are calculated in the plot extractor 610, 628, including altitude and radial velocity estimations. Outputs are then fed to the classifier 612, 630 in each radar. The classifiers 612, 630 should be designated for each radar since the characteristics of each radar type are unique.

In one embodiment, the classifiers 612, 630 output the plots with confidence factors indicating the plot probabilities. The tracker 614 collects the plots from the radar systems 602, 620 and forms tracks under the condition that the plots are classified as aircraft with a confidence factor higher than a predefined value (e.g. 0.6). If a plot is not classified as aircraft, or as a low confidence aircraft, the plot will be ignored for that scan, but may be used for coasting location update.

With the plots classified before tracking, false plots generated by the wind farm will not be treated as aircraft because of the following feature characteristics;
  (1) the altitude estimation is low, (e.g., less than about 4,000 ft from local ground at about 10 nmi, and is close, (e.g., about within 0.5 nmi to known wind farm area);
  (2) the estimated radial velocity does not match scan-to-scan movement;
  (3) the wide Doppler spectrum, (e.g., spread over a few hundred Hertz), fits the wind turbine profile; and/or
  (4) the plot is not detected by the pencil-beam gap filler radar.

In contrast, with the following feature characteristics, the radar plot of an aircraft flying over a wind farm will be classified as aircraft and continue to support the track over the wind farm:
  (1) altitude estimation may drop due to the wind farm interference but is still higher than the normal wind farm altitude, (e.g., higher than about 4,000 ft from local ground at about 10 nmi); and/or
  (2) the plot is detected by the pencil-beam Gap Filler radar and is classified as aircraft with high confidence factor (e.g. >0.6).

It is understood that the features used in the classifier can be provided by a variety of suitable processes and parameters, such as polarimetric characteristics, altitude estimation, detection cluster shape and size, and Doppler features. Exemplary classifier techniques are disclosed in U.S. Pat. No. 6,677,886, filed on Jan. 13, 2004, which is included herein by reference.

Figure 7:
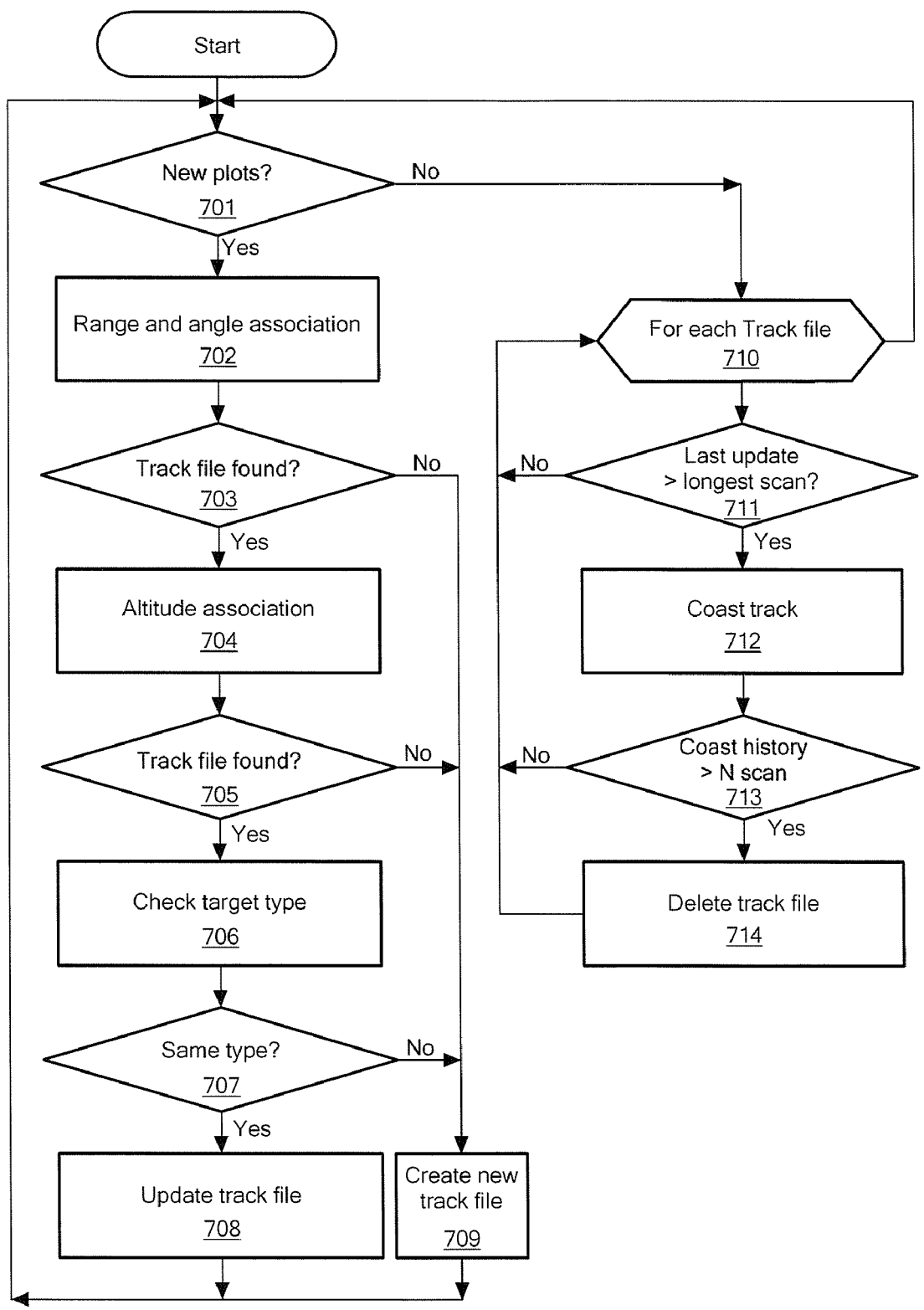
FIG. 7 is a high level flowchart showing the Multi-sensor Tracker process.

FIG. 7 shows an exemplary sequence of steps for implementing blind spot mitigation having target classification in accordance with exemplary embodiments of the invention. A target tracker waits in step 701 for new target plots from multiple radars. When a new target plot is received, the tracker associates the plot location to the existing track files. If the new plot is found to have range and angular location within the associated window of a track file, this new plot is assumed to be the new location of the track file in step 702. In one embodiment, the gap-filler radar is a three dimensional radar and the fan beam radar is equipped with altitude estimation from the high and low beams, as described above. In step 704, the system checks the altitude association and determines in step 705 if the new plot is within the altitude associated window of a track file. In step 706, the system checks the target types between the new plot and the associated track file. If the associated track file is of the same type as determined in step 707, the system updates the track file in step 708 with the new plot location. If any of the association process in above failed, the new plot is used for creating a new track in step 709 that includes target type and altitude.

When waiting for new plots in step 701 times out, for example, the system can examine track files in step 710. If a track file has not been updated for the period of the longest scan time of the radars, as determined in step 711, the track file is updated as coasting in step 712 using the predicted location. If the track file has been coasting for N scans, as determined in step 713, the track file is deleted in step 714.

Exemplary embodiments of the invention merge multiple asynchronous radar data, merge radar data at target classification level, and/or merge radar data between rotating fan-beam radars and pencil-beam phase array radars. Use of the classifier output data (target type) as one of the track association parameters can significantly suppress false tracks and can maintain aircraft tracks over high clutter area.

Additional classification information is now provided. In general, method and apparatus for air clutter detection exploit weather and high/low beam target channels of a terminal S-band ASR air traffic control radar, e.g., 2700 MHZ to 2900 MHz, to create polarimetric data and altitude estimation. By also utilizing Doppler information, the system can classify detections as fixed-wing aircraft, rotary-wing aircraft, birds, insects, rain, hail, false alarms due to ground traffic, wind farm induced clutter, anomalous propagation induced clutter, and the like. In other embodiments, air clutter detection is provided as part of an en-route L-band system.

Polarimetic signatures can be used to distinguish between aircraft and birds, for example. Where a system has a target channel and a weather channel, the weather channel is a different polarization from that of the target channel, and the channels are processed in separate receiver-signal processor channels. The weather channel provides precipitation reflectivity. Using a system processor, the weather channel data is processed in a similar manner to the target channel data. The amplitude ratio and phase difference between the target and weather channel data can be calculated with the resultant amplitude-phase factors providing distinguishing target characteristics. Since the system includes high and low beams, the system can be used as in a mono-pulse radar to estimate target altitude by simultaneously processing the high and low beam data.

Figure 8:
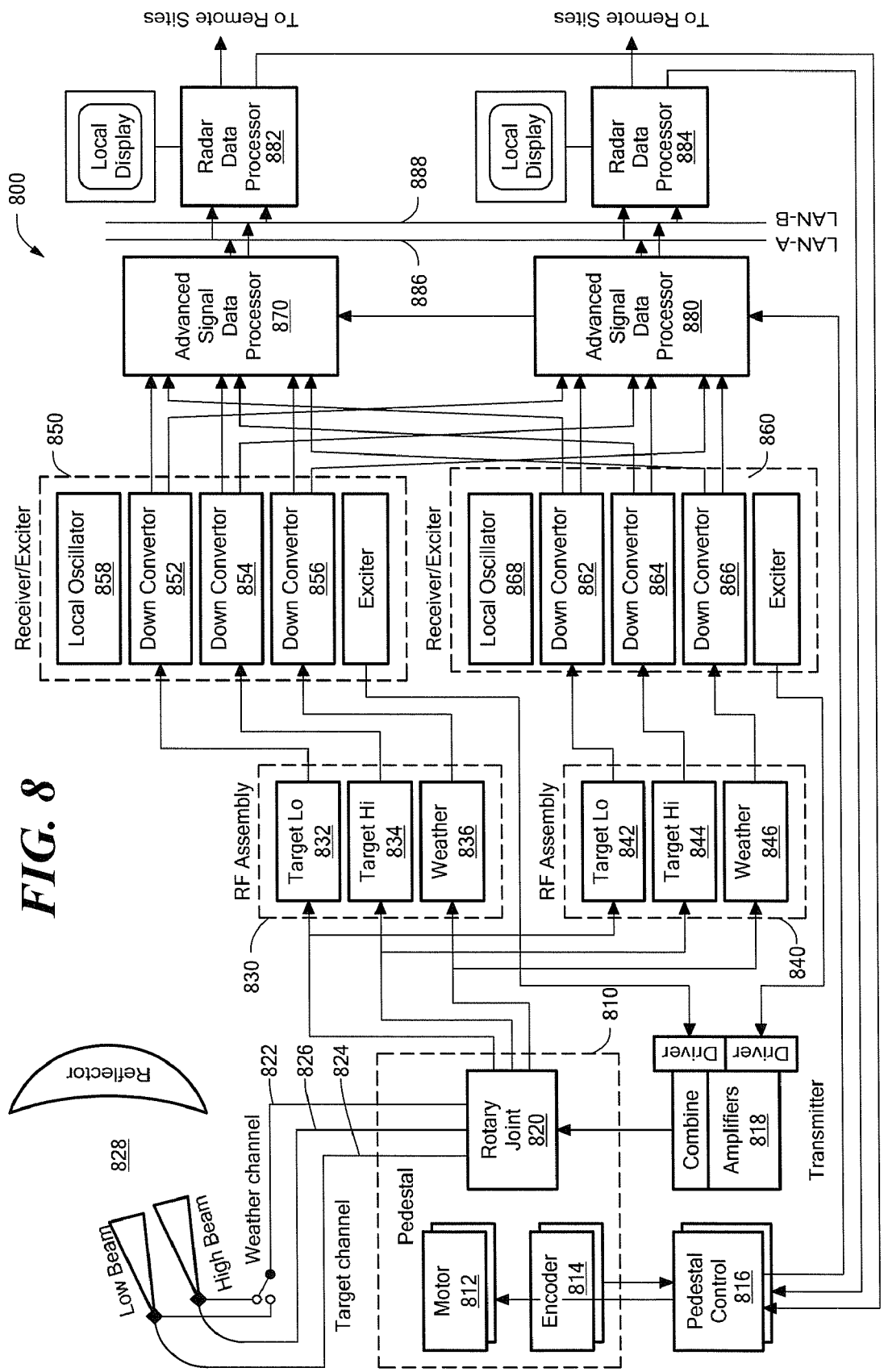
FIG. 8 is a schematic representation of a system providing target classification.

FIG. 8 shows an exemplary system 800 that can provide blind spot mitigation by target classification in accordance with exemplary embodiments of the invention. A pedestal 810 includes a motor 812 and encoder 814 coupled to a pedestal controller 816. A transmitter 818 is coupled to a rotary joint 820 providing a weather channel 822 and low beam and high beam target channels 824, 826 to an antenna assembly 828.

The rotary joint 820 is coupled to a first RF assembly 830 and a second RF assembly 840, each having a target low beam module 832, 842, a target high beam module 834, 844, and a weather module 836, 846. A first receiver/exciter 850 and a second receiver/exciter 860 each include down converter modules 852, 854, 856, 862, 864, 866 and local oscillators 858, 868 for the respective low beam, high beam, and weather signals. The downconverted signals are provided to first and second signal processors 870, 880, which are both coupled to first and second radar data processors 882, 884 via first and second local area networks (LANs) 886, 888, for example.

The system 800 can include features of air traffic control systems that have an independent weather channel and target channel. Weather related false alarms in the target channel are typically not suppressed by checking against the detection of precipitation in the weather channel. Such weather channel reports are also not processed in such a manner as to be able to discern whether the precipitation type is rain, hail or snow.

The inventive system 800 uses data from both the weather high and low beam channels and target high and low beam channels to detect and classify detections for mitigating blind spots. The system takes advantage of the different polarization between the weather and the target channels to provide polarimetric data. In addition, the low and high beam of the target channels provide altitude information. Together with the Doppler and reflectivity information, the system 800 is thus capable of classifying detections and becomes an integrated detection classification system for air traffic control use.

In operation, the signal processor uses the high beam data in the short pulse range, e.g., in the order of 0.5 to 6.5 nmi to avoid the ground clutter, and switches at a predefined range, e.g., 6.5 nmi, to the low beam for complete altitude coverage.

In an exemplary embodiment, the system 800 includes a multi-channel, e.g., seven, rotary joint 820 to enable both the high beam data and the low beam data to be processed concurrently over the full instrument range. For each detection in the low beam data, the system searches for a corresponding detection in the high beam data at the same range. The altitude of the detection is estimated using a lookup table with the target amplitude ratio between the two beams as one of the indexes and the range as the other. An exemplary altitude estimation technique is shown and described by H. R. Ward in U.S. Pat. No. 4,961,075, which is incorporated herein by reference. The estimated altitude of the detection is useful for separating aircraft from false alarms due to moving clutter, such as birds, weather, etc., ground traffic and wind farms.

The system 800 also performs target detection using the weather channel data. Since the weather channel data is of a different polarization to the target channel, the differential reflectivity, differential phase and correlation coefficient between the two polarization data can be calculated. According to D. S. Zrnic, birds and insects have differential reflectivity between 2 and 9 dB and differential phase about 25 degrees; ground clutter has large differential reflectivity but has a zero mean value; weather has low differential reflectivity and phase but has high correlation coefficient. Discrimination between birds and insects is possible because insects tend to have higher differential reflectivity, while birds have higher differential phase.

Figure 9:
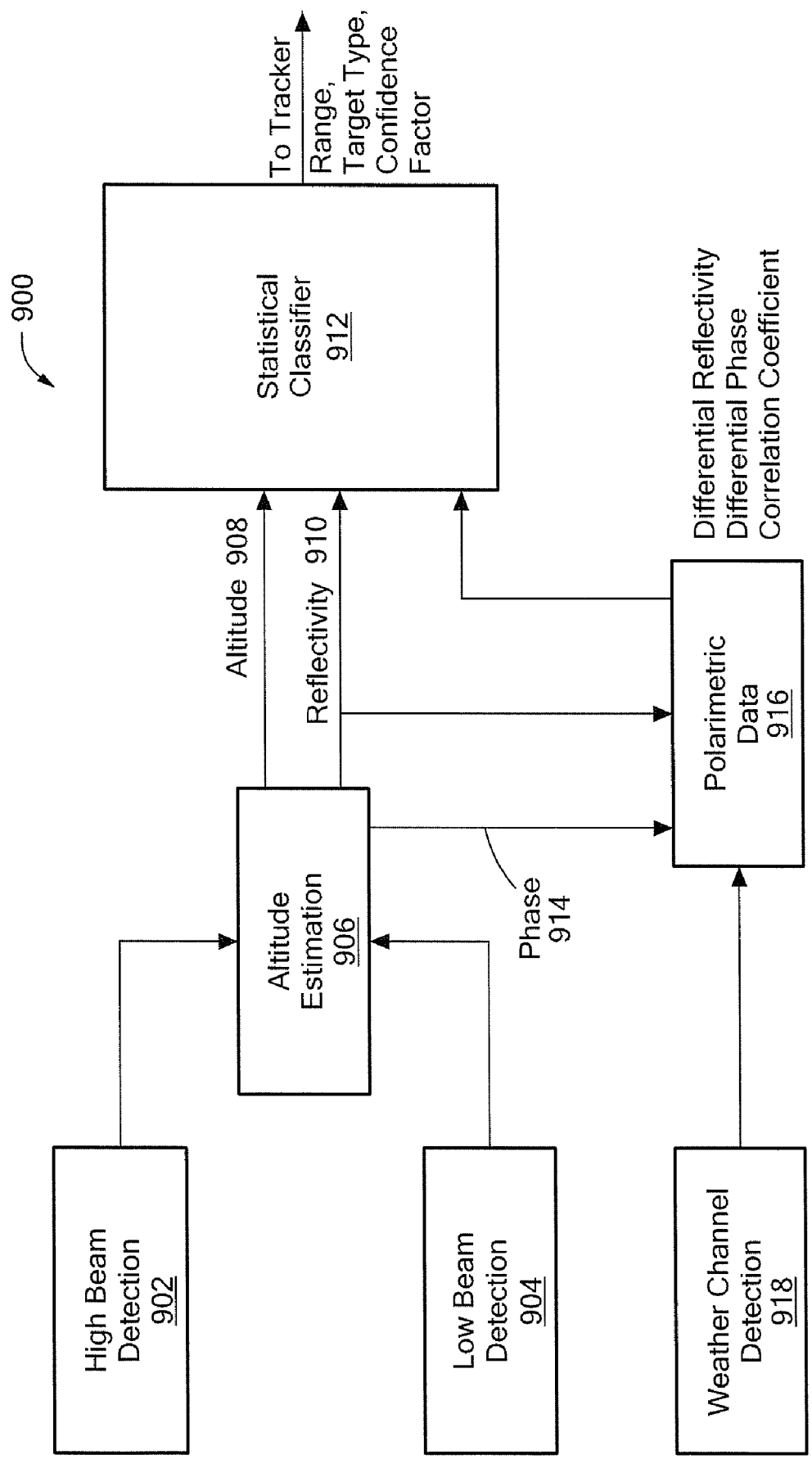
FIG. 9 is a block diagram showing additional detail for the system of FIG. 8.

FIG. 9 shows an exemplary system 900 having target classification in accordance with exemplary embodiments of the invention. The system 900 includes a high beam channel 902 and a low beam channel 904 providing data to an altitude estimation module 906. The altitude estimation module 906 outputs altitude 908 and reflectivity 910 information to statistical classifier module 912.

The altitude estimation module 906 provides phase information 914 to a polarimetric data module 916, which receives data from a weather channel detection module 918 as well as reflectivity information 910 and phase information 914 from the altitude estimation module 906. The polarimetric data module 916 provides differential reflectivity information, differential phase information, and correlation coefficient information to the statistical classifier module 912.

In general, the polarimetric characteristics are used as detection features. Together with the estimated altitude these features are mapped to the statistics of the known detection classes, which include aircraft types, weather types, birds, insects and false alarm types. These statistics form a multi-dimensional "training database." During normal operation, the measured features are mapped to the training database to read out the detection classes. The highest class with the highest population is selected as the result and the population count is converted to a confidence factor. The confidence factors over multiple radar scans are accumulated for the detections and the conferred results are reported to the air traffic control display. The implementation of such statistical classifier could be similar to the one used in reference.

Figure 10:
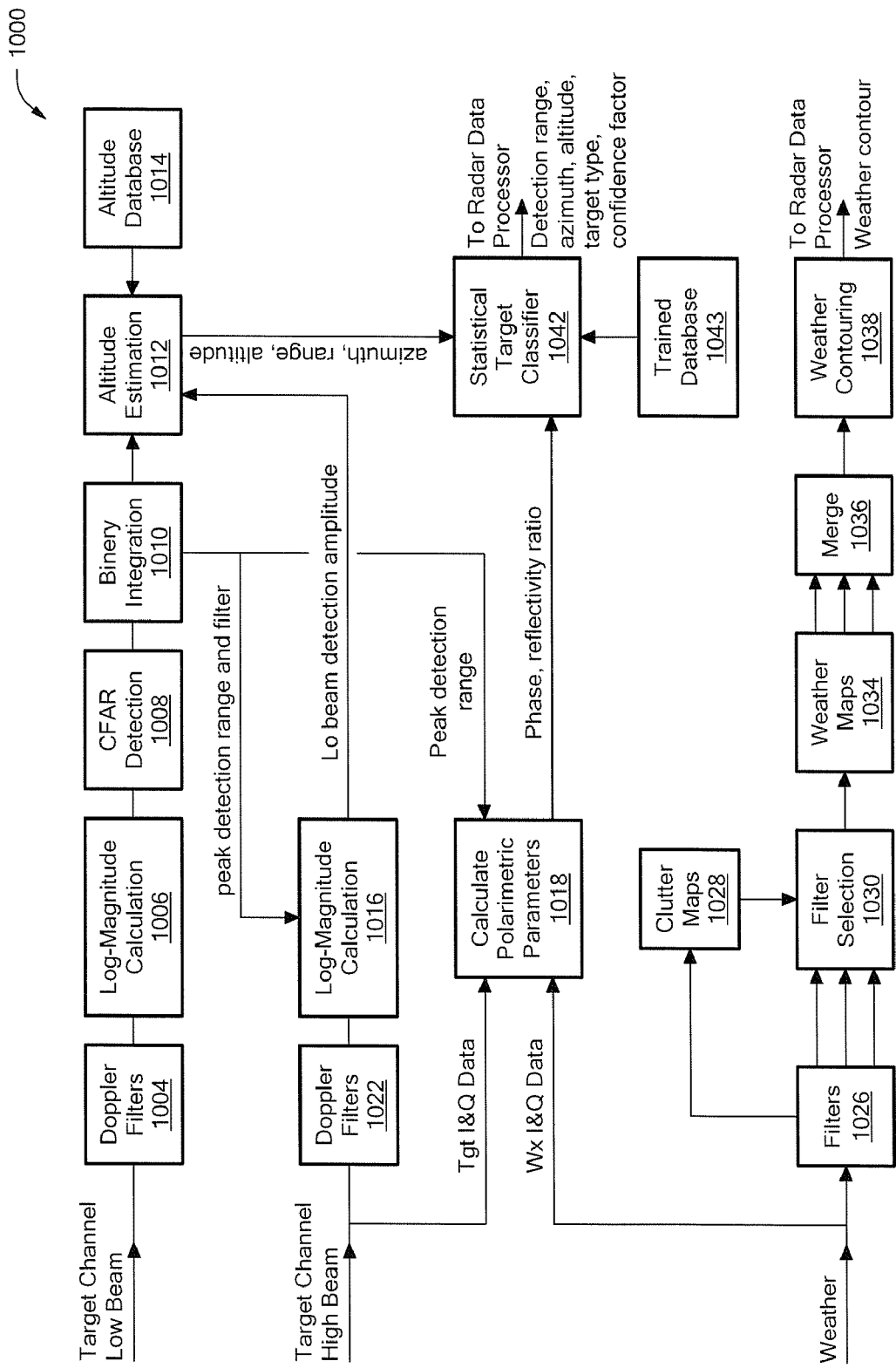
FIG. 10 is a block diagram showing additional detail for the system of FIG. 9.

FIG. 10 shows further details 1000 of the system 900 of FIG. 9. For the low beam target channel, data is processed by a series of modules including a Doppler filter module 1004, and log-magnitude calculation module 1006. A CFAR (Constant False Alarm Rate) detection module 1008 is coupled to a binary integration module 1010, which provides an output to an altitude estimation module 1012. The altitude estimation module 1012 and altitude database 1014 are described more fully below.

Binary integration data (peak detection range and filter) is provided to a log-magnitude calculation module 1016 for the high beam target channel and to a module to calculate polarimetric parameters 1018. The high beam target channel path includes a Doppler filter module 1022, which is coupled to the log magnitude calculation module 1016.

The low beam weather channel data is processed by a pulse compression module 1024 and a filter module 1026. A clutter map module 1028, a filter selection module 1030, and a clear day coefficient selection module 1032 are coupled in parallel and exchange information with the filter module 1026. A weather map module 1034 receives the filtered data and provides a series of outputs to a merge module 1036, which provides output data to a weather contour module 1038 coupled to a radar data processor.

The module 1018 to calculate polarimetric parameters receives target I and Q data from the high beam target pulse compression module 1020 and weather I and Q data from the weather channel pulse compression module 1024 and generates phase and reflectivity ratio information, as described more fully below. This information is provided to a statistical target classifier module 1042, which receives data from a trained database 1043, outputting detection range, azimuth, altitude, target type, and confidence information provided to an RDP.

Figures 11A, 11B:
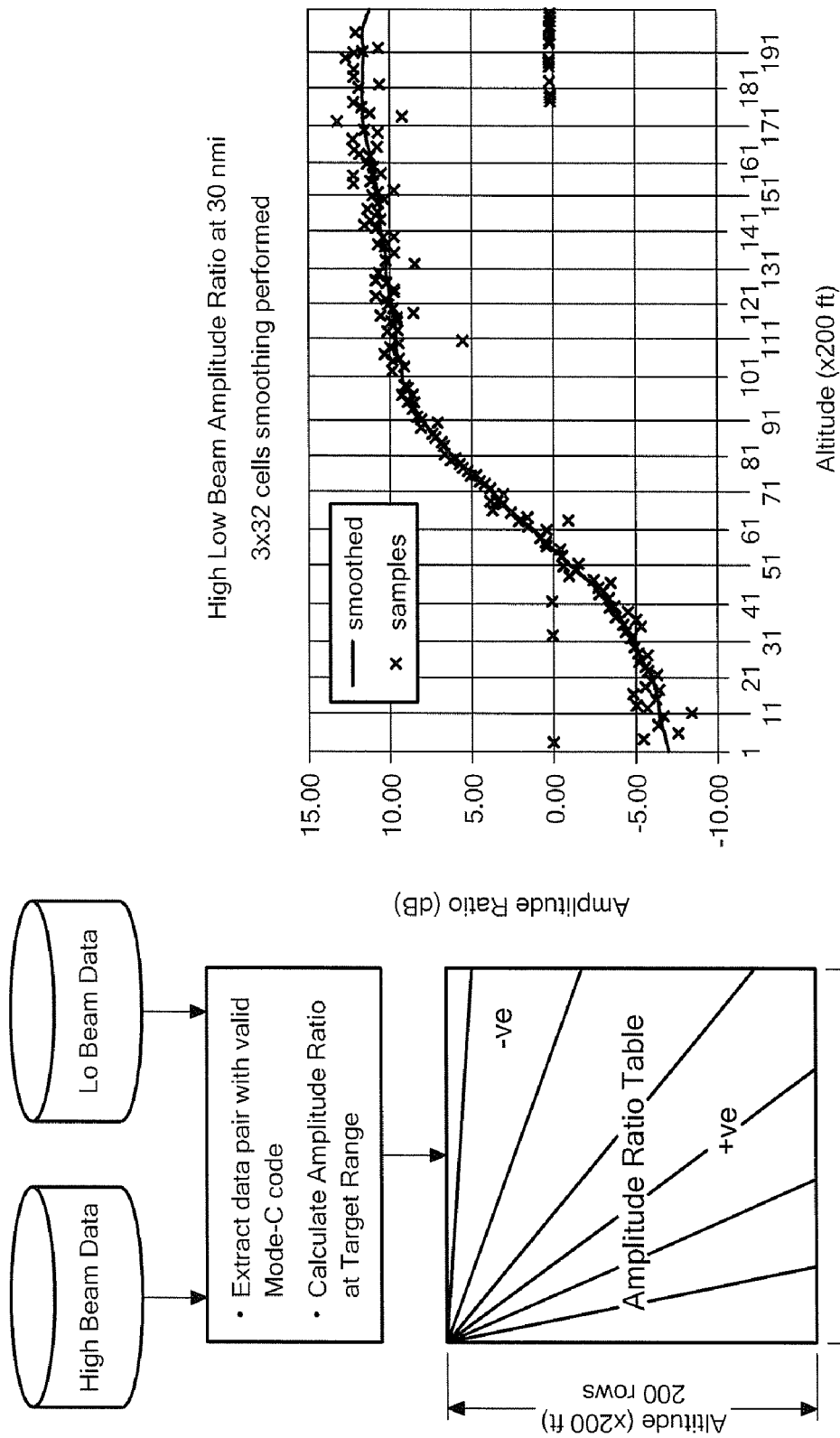
FIG. 11 is a graphical representation of the method for generating the amplitude ratio versus altitude lookup table.

As shown in FIGS. 11 and 11A, the high beam data and low beam data pair are extracted along with the Mode-C code. An amplitude ratio for the high and low beam data is calculated for a target range to generate an amplitude ratio table at the altitude given by the Mode-C code, as shown. In one embodiment, a 3×32 cells operator (32 range columns and 3 altitude rows) is used to average the amplitude ratio. The table is then smoothed before being used for altitude estimation. FIG. 11A shows the smoothed amplitude ratio versus altitude curve for the range of 30 ml.

Figure 12A:
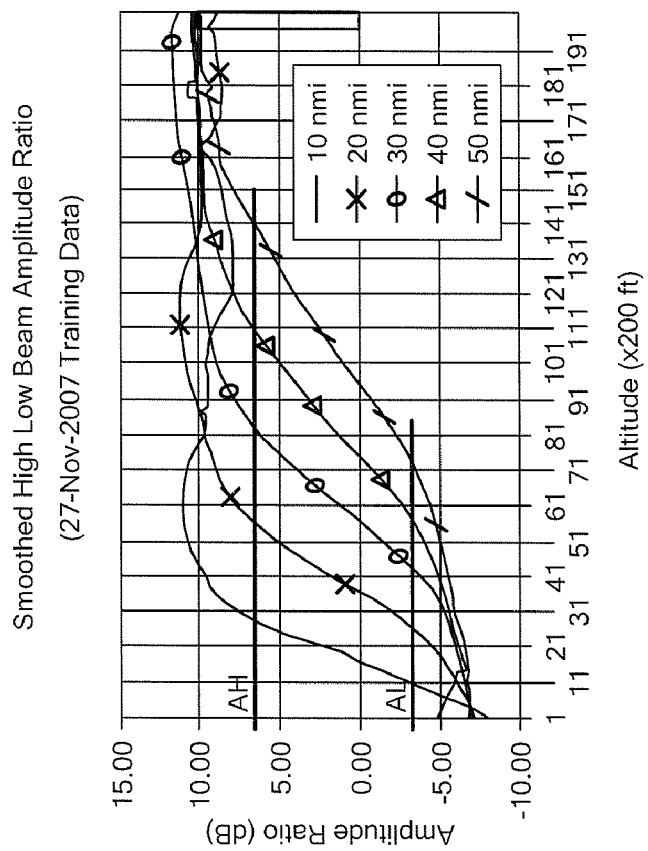
FIG. 12A is a graphical representation of smoothed high beam amplitude ratio data.
Figure 12:
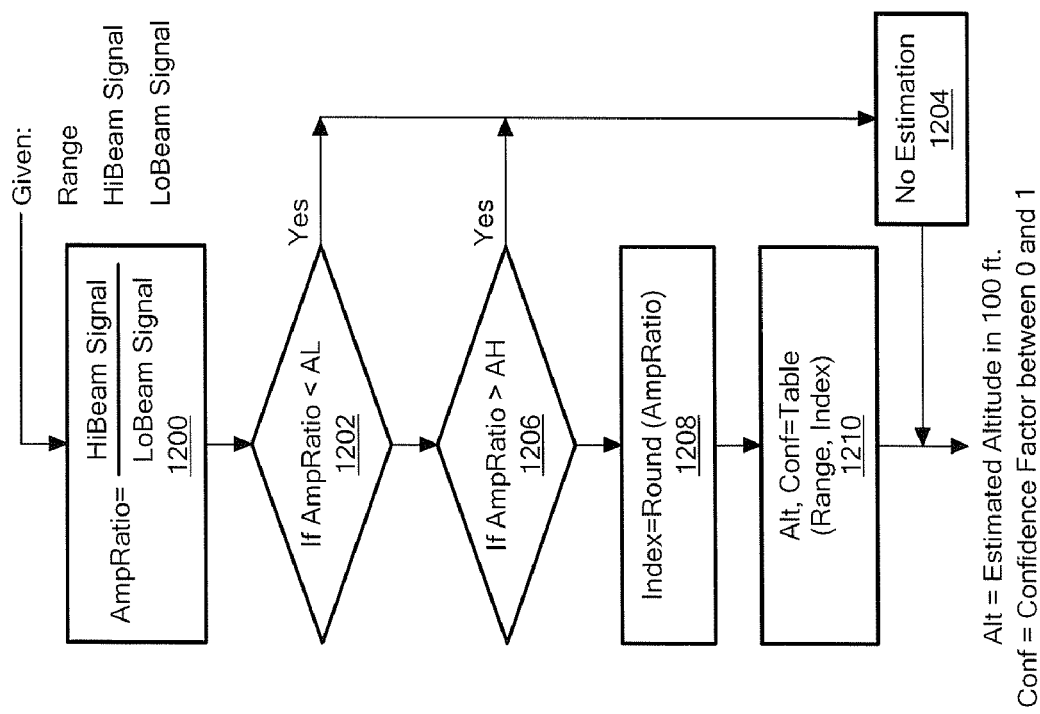
FIG. 12 is a flow diagram showing exemplary altitude estimating processing

FIG. 12 shows an exemplary sequence of steps for estimating altitude in accordance with exemplary embodiments of the invention. In step 500, the amplitude ratio is determined for a given range from the high beam signal over the low beam signal. In step 502, it is determined whether the amplitude ratio is less than a low threshold value. If so, no estimation is performed in step 504. If not, then it is determined in step 506 whether the amplitude ratio is greater than a high threshold. If so, no altitude estimation is performed. If not, in step 508, the amplitude ratio is rounded to an index value. In step 510, an altitude estimation and confidence value are generated from a table, such as the table of FIG. 12A, from the range and index values.

In an exemplary embodiment, the target altitude is estimated at 100 foot intervals with a confidence factor ranging from 0 to 1. The confidence factor can be pre-calculated in the table based on the standard deviation of the altitude value at the given amplitude ratio before smoothing was applied, for example. It is understood that the granularity of the altitude estimate can vary to meet the needs of a particular application and the information obtainable from the radar system.

FIG. 12A shows an exemplary plot of amplitude ratio versus altitude at various ranges, shown as 10, 20, 30, 40, and 50 nautical miles (nmi) for exemplary data. It is understood that the plotted data is smoothed. The approximate threshold values, AH and AL, are also shown marking the linear portion of the smoothed data.

FIG. 13 shows an exemplary sequence of steps for polarimetric parameter calculation in accordance with exemplary embodiments of the invention. For given range, Ic, Qc, co-polarization data, and Ir, Qr reverse polarization data, in step 1300 I and Q data is selected from the specified range R. In step 1302, the differential reflectivity $Z_{DR}$ is computed as $$Z_{DR} = 10 \log_{10}\left(\frac{I_C^2 + Q_C^2}{R^4}\right) - 10 \log_{10}\left(\frac{I_r^2 + Q_r^2}{R^4}\right).$$

Differential reflectivity is further disclosed in U.S. Patent Publication No. 2010/0079328, filed on May 5, 2009, which is incorporated herein by reference. In step 1304, the differential phase $\phi_{DR}$ is computed as $$\phi_{DR} = \tan^{-1}\left(\frac{I_c}{Q_c}\right) - \tan^{-1}\left(\frac{I_r}{Q_r}\right).$$

Figure 14:
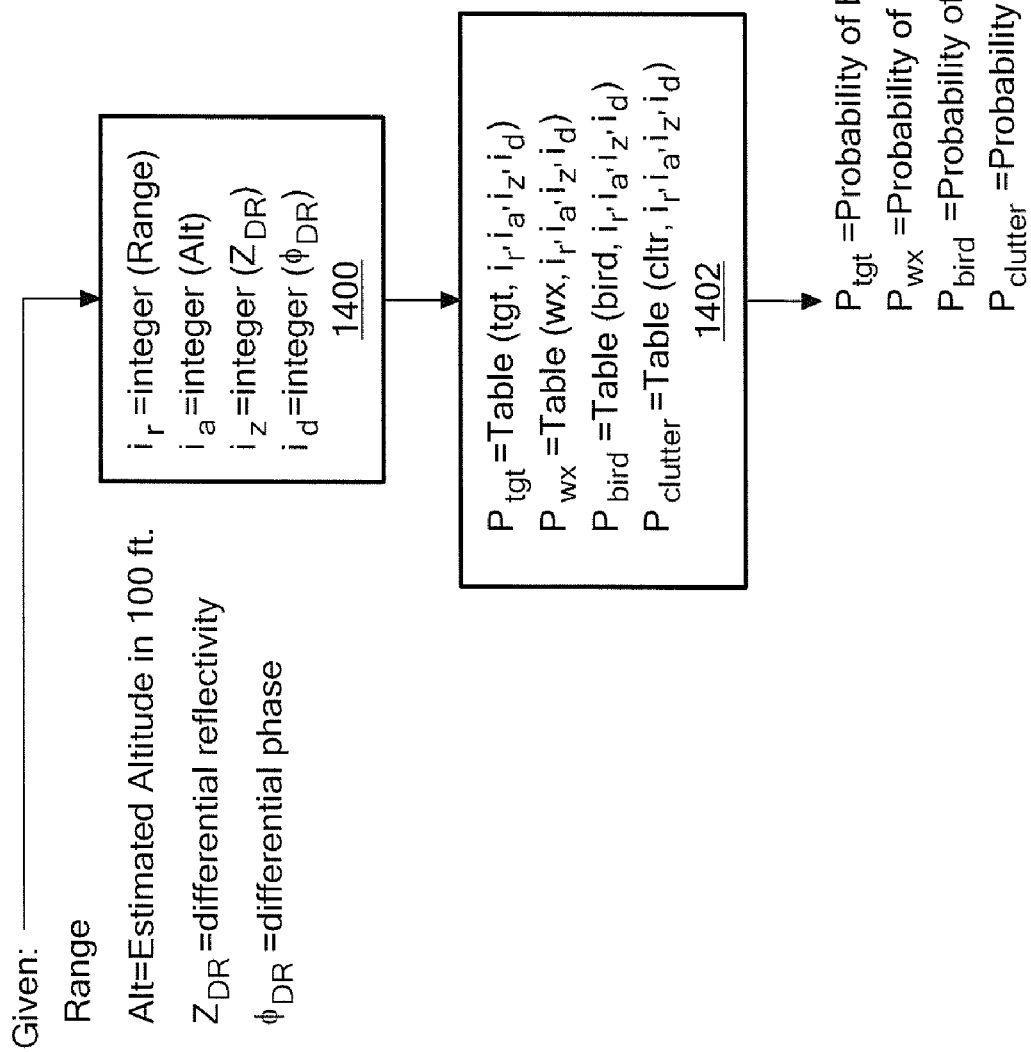
FIG. 14 is a flow diagram of exemplary probability processing.

FIG. 14 shows an exemplary sequence of steps for statistical target classification. In step 1400, for given range R, estimated altitude Alt, differential reflectivity $Z_{DR}$, and differential phase $\phi_{DR}$, integer values $i_r$, $i_a$, $i_z$, and $i_d$, are generated in step 1402 to generate probability values. More particularly, a probability of the target being an aircraft $P_{tgt}$ is computed from a table using values tgt, $i_r$, $i_a$, $i_z$, $i_d$. In an exemplary embodiment, the indexes tgt, wx, bird and cltr represent four separate tables that form the trained database filled with measured data from known objects such as aircraft (tgt), weather (wx), birds (bird) and ground clutter (cltr). Similarly, a probability of a target being a weather-related false alarm is determined from a table based on values for wx, $i_r$, $i_a$, $i_z$, $i_d$. The probability of a target being birds is determined from bird, $i_r$, $i_a$, $i_z$, $i_d$ and the probability of a target being ground clutter related false alarm is determined from cltr, $i_a$, $i_z$, $i_d$.

In another embodiment, the amplitude ratio ($Z_{DR}$) and phase difference ($\phi_{DR}$) between the target and weather channel data can be calculated to distinguish target characteristics. As noted above, a DASR system, has a target and a weather channel. The weather channel is a different polarization to the target channel, and they are processed in separate receiver-signal processor channels.

The DASR weather channel determines precipitation reflectivity. In an exemplary embodiment, the weather channel data is processed in a similar manner to the target channel data. This approach provides simultaneous polarimetric data, which is an improvement over polarimetric data in alternative radar dwells. The amplitude ratio ($Z_{DR}$) and phase difference ($\phi_{DR}$) between the target and weather channel data can be calculated as follows:

$$Z_{DR} = 10 \cdot \log_{10}\left(\frac{I_c^2 + Q_c^2}{I_r^2 + Q_r^2}\right) \tag{1}$$

$$\phi_{DR} = \tan^{-1}\left(\frac{I_c}{Q_c}\right) - \tan^{-1}\left(\frac{I_r}{Q_r}\right) \tag{2}$$

where R is range, $I_c$ and $Q_c$ are the in-phase and quadrature data of the co-polarization channel, and $I_r$ and $Q_r$ are the in-phase and quadrature data of the reverse polarization channel.

It should be noted that while some systems, such as current ASR systems use a dual fan beam, they do not provide target altitude without associated beacon data. Since a DASR has both high and low beams, these beams can be processed simultaneously in a similar manner as in a mono-pulse radar to estimate target altitude.

Figure 15:
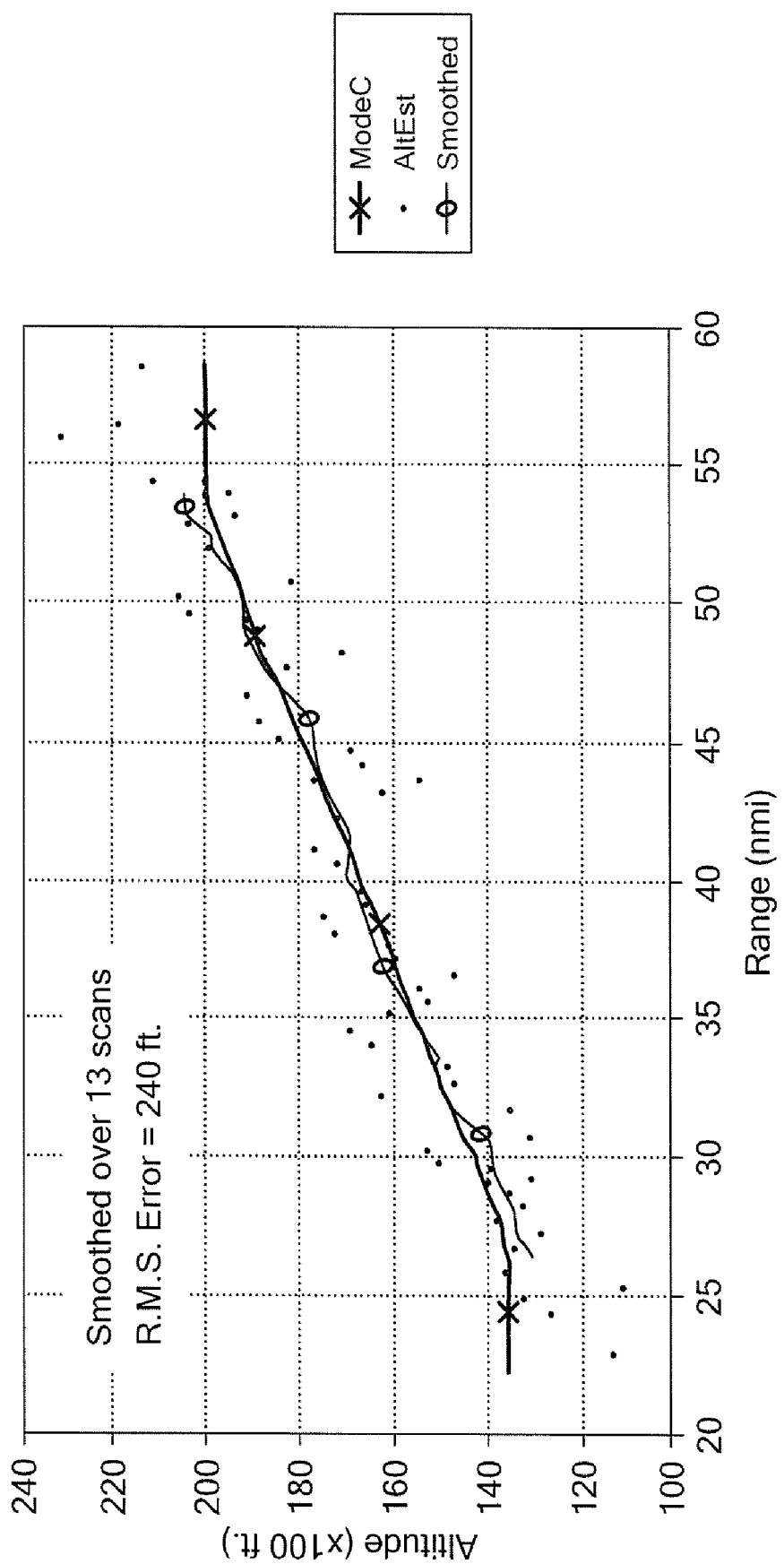
FIG. 15 is a graphical representation of altitude estimation versus range.

Actual data was recorded for simultaneous polarimetric data. FIG. 15 shows an example of estimated target altitude in comparison with the target altitude from the beacon radar. The altitude estimations (dots) have deviation from the beacon radar reported altitude (Mode Code). Smoothing the altitude estimations over 13 scans, for example, provides a more accurate estimation of the target altitude. In this case the RMS error is 240 ft.

Figure 17:
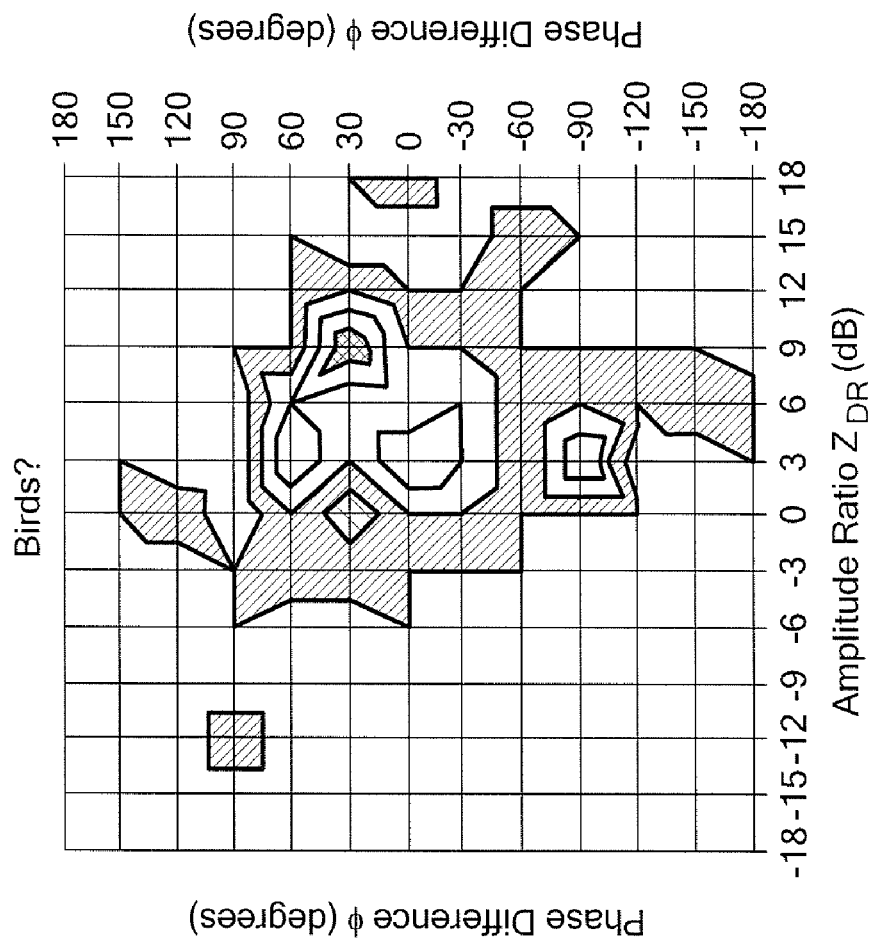
FIG. 17 is a mapping of amplitude ratio versus phase difference for a possible bird migration.
Figure 16:
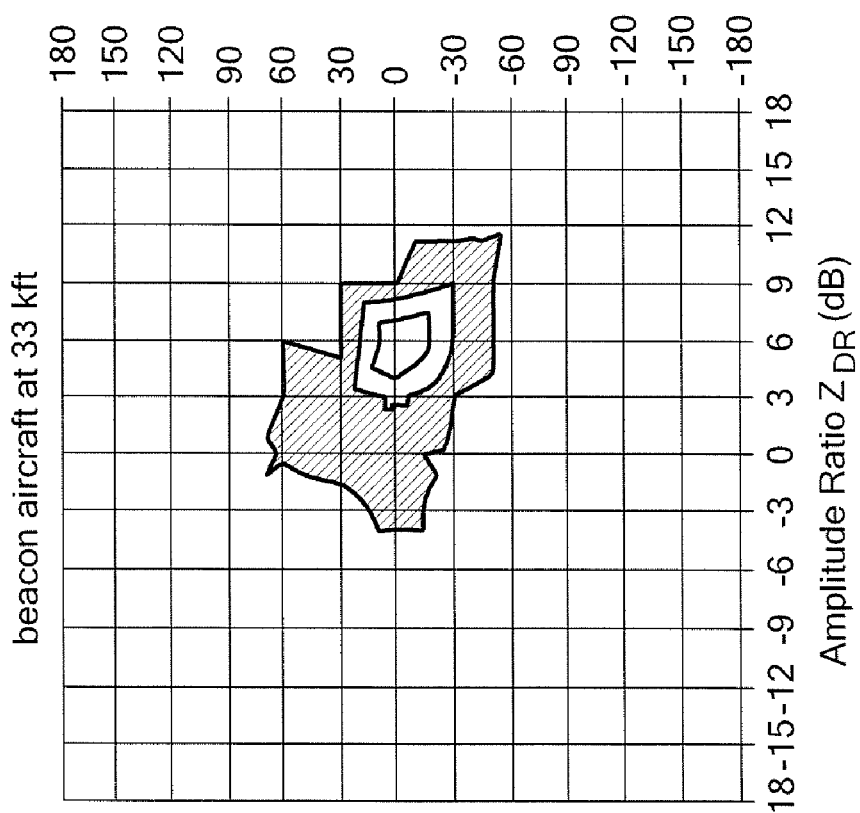
FIG. 16 is a mapping of amplitude ratio versus phase difference for an aircraft at 33 kft.

FIG. 16 shows the distinct features of an aircraft and FIG. 17 shows possible bird data expressed in amplitude ratio versus phase difference maps based upon collected data. FIG. 16 shows the peak of the distribution at 0 degree phase difference and 6 dB amplitude ratio. The bird data in FIG. 17 has a peak of the distribution at 30 degrees phase difference and 9 dB amplitude ratio. It should be noted that the distribution in FIG. 17 has wider spread than FIG. 16.

It is understood that a variety of polarizations can be used in various embodiments. Exemplary polarizations include linear polarization (transmission in vertical polarization, channel A received in elliptical polarization, channel B received in vertical polarization), circular polarization (transmission in circular polarization, channel A received in circular co-polarization, and channel B received in circular reverse polarization). As noted above, circular polarimetric data shows clear differences between channels and target types. It is understood that further polarization configurations are possible.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
    employing a first radar;
    identifying a blind spot in coverage of the first radar;
    providing a second radar to illuminate the blind spot; and
    merging data from the first and second radars using target classification prior to tracking to reduce false targets, wherein the target classification includes each of polarimetric characteristics, altitude estimation, detection cluster shape, and Doppler information.

2. The method according to claim 1, wherein the blind spot is created by a wind farm.

3. The method according to claim 1, wherein the first radar is an airport surveillance radar and the second radar is a gap filler radar.

4. The method according to claim 3, wherein the gap filler radar is a pencil beam radar.

5. The method according to claim 3, wherein the airport surveillance radar includes parallel paths for a high beam receiver and a low beam receiver.

6. The method according to claim 1, further including identifying false targets by one or more of: an altitude estimation of a target is low and is near the blind spot, which includes a wind farm area; an estimated radial velocity of the target does not match scan-to-scan movement; a wide Doppler spectrum fits the wind turbine profile; and the target is not detected by the second radar, which is a pencil-beam gap filler radar.

7. The method according to claim 6, further including identifying an aircraft target by detecting an altitude estimation drop due to interference by the wind farm that is higher than a predefined wind farm altitude; and/or detecting the target by the pencil-beam gap filler radar with, an aircraft classification having a confidence factor greater than and is classified as aircraft with a confidence factor greater than a selected threshold.

8. A system, comprising:
    a first radar having a blind spot in coverage for the first radar;
    a second radar to illuminate the blind spot; and
    a tracker to merge data from the first and second radars using target classification prior to tracking to reduce false targets, wherein the target classification includes each of polarimetric characteristics, altitude estimation, detection cluster shape, and Doppler information.

9. The system according to claim 8, wherein the blind spot is created by a wind farm.

10. The system according to claim 8, wherein the first radar is an airport surveillance radar and the second radar is a gap filler radar.

11. The system according to claim 10, wherein the gap filler radar is a pencil beam radar.

12. The system according to claim 10, wherein the airport surveillance radar includes parallel paths for a high beam receiver and a low beam receiver.

13. The system according to claim 8, wherein the tracker identifies false targets by one or more of: an altitude estimation of a target is low and is near the blind spot, which includes a wind farm area; an estimated radial velocity of the target does not match scan-to-scan movement; a wide Doppler spectrum fits the wind turbine profile; and the target is not detected by the second radar, which is a pencil-beam gap filler radar.

14. The system according to claim 13, wherein the tracker identifies an aircraft target by detecting an altitude estimation drop due to interference by the wind farm that is higher than a predefined wind farm altitude; and/or detecting the target by the pencil-beam gap filler radar with an aircraft classification having a confidence factor greater than and is classified as aircraft with a confidence factor greater than a selected threshold.

15. A method, comprising:
    employing a first radar;
    identifying a blind spot in coverage of the first radar;
    providing a second radar to illuminate the blind spot;
    merging data from the first and second radars using target classification prior to tracking to reduce false targets;
    identifying false targets by one or more of: an altitude estimation of a target is low and is near the blind, spot, which includes a wind, farm area; an estimated radial velocity of the target does not match scan-to-scan movement; a wide Doppler spectrum fits the wind turbine profile; and the target is not detected by the second radar, which is a pencil-beam gap filler radar; and
    identifying an aircraft target by detecting an altitude estimation drop due to interference by the wind farm that is higher than a predefined wind farm altitude; and/or detecting the target by the pencil-beam gap filler radar with an aircraft classification having a confidence factor greater than and is classified as aircraft with a confidence factor greater than a selected threshold.

* * * * *